(12) United States Patent
Oh et al.

(10) Patent No.: US 11,554,788 B2
(45) Date of Patent: Jan. 17, 2023

(54) APPARATUS FOR DISPLAYING DRIVING STATE OF VEHICLE, SYSTEM INCLUDING THE SAME AND METHOD THEREOF

(71) Applicants: HYUNDAI MOTOR COMPANY, Seoul (KR); KIA MOTORS CORPORATION, Seoul (KR)

(72) Inventors: Dong Eon Oh, Seoul (KR); Hoi Won Kim, Gwacheon-si (KR); Doo Jin Um, Hwaseong-si (KR); Beom Jun Kim, Seoul (KR); In Wan Kang, Seoul (KR); Dae Young Kim, Gwangmyeong-si (KR); Jin Su Jeong, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 302 days.

(21) Appl. No.: 16/290,376

(22) Filed: Mar. 1, 2019

(65) Prior Publication Data
US 2019/0315374 A1 Oct. 17, 2019

Related U.S. Application Data

(60) Provisional application No. 62/655,831, filed on Apr. 11, 2018.

(30) Foreign Application Priority Data

Dec. 7, 2018 (KR) .................. 10-2018-0157360

(51) Int. Cl.
*B60K 35/00* (2006.01)
*B60W 30/18* (2012.01)
(Continued)

(52) U.S. Cl.
CPC ............ *B60W 50/14* (2013.01); *B60K 35/00* (2013.01); *B60W 30/18163* (2013.01);
(Continued)

(58) Field of Classification Search
CPC .......... B60W 50/14; B60W 30/18163; B60W 50/16; B60W 2050/146; B60W 2552/30;
(Continued)

(56) References Cited

U.S. PATENT DOCUMENTS 4,361,202 A  11/1982 Minovitch
5,314,037 A  5/1994 Shaw et al.
(Continued)

FOREIGN PATENT DOCUMENTS

DE  198 21 122 A1  6/1999
DE  101 14 187 A1  9/2002
(Continued)

OTHER PUBLICATIONS

Office Action dated Dec. 10, 2020 from the corresponding U.S. Appl. No. 16/269,140, 31 pp.
(Continued)

*Primary Examiner* — Abby Y Lin
*Assistant Examiner* — Hossam M Abd El Latif
(74) *Attorney, Agent, or Firm* — Morgan, Lewis & Bockius LLP

(57) ABSTRACT

An apparatus for displaying a driving state of a vehicle, a system including the same and a method thereof is provided. The apparatus includes a processor that determines a change in a state of a lane change assistance function and controls a step-by-step notification based on the change in the state of the lane change assistance function, and a display controlled by the processor to display the step-by-step notification based on the change in the state of the lane change assistance function.

18 Claims, 12 Drawing Sheets

(51) Int. Cl.
  *B60W 50/14* (2020.01)
  *G08G 1/16* (2006.01)
  *B60W 50/16* (2020.01)
(52) U.S. Cl.
  CPC ............ *B60W 50/16* (2013.01); *G08G 1/167* (2013.01); *B60K 2370/16* (2019.05); *B60K 2370/52* (2019.05); *B60W 2050/146* (2013.01)
(58) Field of Classification Search
  CPC ....... B60W 2050/143; B60W 2520/10; B60W 2540/215; B60W 2554/00; B60W 2552/00; B60K 35/00; B60K 2370/16; B60K 2370/52; G08G 1/167
  USPC .......................................................... 701/41
  See application file for complete search history.

(56) References Cited

U.S. PATENT DOCUMENTS

| | | |
|---|---|---|
| 5,521,579 A | 5/1996 | Bernhard |
| 6,055,467 A | 4/2000 | Mehring et al. |
| 6,473,678 B1 | 10/2002 | Satoh et al. |
| 6,842,687 B2 | 1/2005 | Winner et al. |
| 7,363,140 B2 | 4/2008 | Ewerhart et al. |
| 7,821,421 B2 | 10/2010 | Tamir et al. |
| 8,073,595 B2 | 12/2011 | Tabata et al. |
| 8,457,827 B1 | 6/2013 | Ferguson et al. |
| 8,521,352 B1 | 8/2013 | Ferguson et al. |
| 8,798,841 B1 | 8/2014 | Nickolaou et al. |
| 8,874,301 B1 | 10/2014 | Rao et al. |
| 9,014,919 B2 | 4/2015 | Kim |
| 9,079,571 B2 | 7/2015 | Trost et al. |
| 9,134,731 B2 | 9/2015 | Healey et al. |
| 9,315,178 B1 | 4/2016 | Ferguson et al. |
| 9,527,441 B2 | 12/2016 | Matsumura |
| 9,682,708 B2 | 6/2017 | Maruyama |
| 9,682,725 B2 | 6/2017 | Yamaoka |
| 9,874,871 B1 | 1/2018 | Zhu et al. |
| 10,131,356 B2 | 11/2018 | Takae |
| 10,152,883 B2 | 12/2018 | Fujimaki |
| 10,183,668 B2 | 1/2019 | Takae |
| 10,202,123 B2 | 2/2019 | Aoki |
| 10,259,459 B2 | 4/2019 | Takae |
| 10,286,907 B2 | 5/2019 | Nishiguchi et al. |
| 10,324,463 B1 | 6/2019 | Konrardy et al. |
| 10,449,856 B2 | 10/2019 | Kojima |
| 10,449,971 B2 | 10/2019 | Arakawa et al. |
| 10,451,730 B2 | 10/2019 | Talamonti et al. |
| 10,509,406 B2 | 12/2019 | Choi et al. |
| 10,558,213 B2 | 2/2020 | Sato et al. |
| 10,618,523 B1 | 4/2020 | Fields et al. |
| 10,627,813 B2 | 4/2020 | Tsuji et al. |
| 10,663,971 B2 | 5/2020 | Sugawara et al. |
| 10,676,084 B2 | 6/2020 | Fujii |
| 10,689,005 B2 | 6/2020 | Oishi et al. |
| 10,713,952 B2 | 7/2020 | Ogawa |
| 10,814,913 B2 | 10/2020 | Fujii |
| 10,935,974 B1 | 3/2021 | Fields et al. |
| 2003/0163239 A1 | 8/2003 | Winner et al. |
| 2005/0137782 A1 | 6/2005 | Shinada |
| 2005/0228588 A1 | 10/2005 | Braeuchle et al. |
| 2005/0256630 A1 | 11/2005 | Nishira et al. |
| 2006/0000991 A1 | 1/2006 | Ewerhart et al. |
| 2007/0043505 A1 | 2/2007 | Leicht |
| 2007/0255474 A1 | 11/2007 | Hayakawa et al. |
| 2008/0172153 A1 | 7/2008 | Ozaki et al. |
| 2008/0204212 A1 | 8/2008 | Jordan et al. |
| 2009/0005933 A1 | 1/2009 | Tabata et al. |
| 2009/0088925 A1 | 4/2009 | Sugawara et al. |
| 2009/0132125 A1 | 5/2009 | Yonezawa et al. |
| 2009/0171533 A1 | 7/2009 | Kataoka |
| 2009/0194350 A1 | 8/2009 | Rattapon et al. |
| 2009/0299573 A1 | 12/2009 | Thrun et al. |
| 2009/0319113 A1 | 12/2009 | Lee |
| 2010/0010733 A1 | 1/2010 | Krumm |
| 2010/0042282 A1 | 2/2010 | Taguchi et al. |
| 2010/0289632 A1 | 11/2010 | Seder et al. |
| 2011/0169625 A1 | 7/2011 | James et al. |
| 2011/0196592 A1 | 8/2011 | Kashi et al. |
| 2011/0241862 A1 | 10/2011 | Debouk et al. |
| 2011/0251758 A1 | 10/2011 | Kataoka |
| 2011/0293145 A1 | 12/2011 | Nogami et al. |
| 2012/0166032 A1 | 6/2012 | Lee et al. |
| 2012/0283907 A1 | 11/2012 | Lee et al. |
| 2012/0296522 A1 | 11/2012 | Otuka |
| 2013/0063595 A1 | 3/2013 | Niem |
| 2013/0066525 A1 | 3/2013 | Tomik et al. |
| 2013/0226406 A1 | 8/2013 | Ueda et al. |
| 2013/0253793 A1 | 9/2013 | Lee et al. |
| 2014/0074356 A1 | 3/2014 | Bone |
| 2014/0309855 A1 | 10/2014 | Tran |
| 2014/0309889 A1 | 10/2014 | Kim |
| 2014/0336896 A1 | 11/2014 | Udaka et al. |
| 2015/0006012 A1 | 1/2015 | Kammel et al. |
| 2015/0006013 A1 | 1/2015 | Wimmer et al. |
| 2015/0019063 A1 | 1/2015 | Lu et al. |
| 2015/0094899 A1 | 4/2015 | Hackenberg et al. |
| 2015/0148985 A1 | 5/2015 | Jo |
| 2015/0166062 A1 | 6/2015 | Johnson et al. |
| 2015/0204687 A1 | 7/2015 | Yoon et al. |
| 2015/0353082 A1 | 12/2015 | Lee et al. |
| 2015/0355641 A1 | 12/2015 | Choi et al. |
| 2015/0360721 A1 | 12/2015 | Matsuno et al. |
| 2016/0001781 A1 | 1/2016 | Fung et al. |
| 2016/0091896 A1 | 3/2016 | Maruyama |
| 2016/0091897 A1 | 3/2016 | Nilsson et al. |
| 2016/0107682 A1 | 4/2016 | Tan et al. |
| 2016/0107687 A1 | 4/2016 | Yamaoka |
| 2016/0187879 A1 | 6/2016 | Mere et al. |
| 2016/0225261 A1 | 8/2016 | Matsumoto |
| 2016/0250968 A1 | 9/2016 | Shirakata et al. |
| 2016/0272204 A1 | 9/2016 | Takahashi et al. |
| 2016/0288707 A1 | 10/2016 | Matsumura |
| 2016/0297431 A1 | 10/2016 | Eigel et al. |
| 2016/0297447 A1 | 10/2016 | Suzuki |
| 2016/0339913 A1 | 11/2016 | Yamashita et al. |
| 2016/0349066 A1* | 12/2016 | Chung ............... G01C 21/3658 |
| 2016/0368492 A1 | 12/2016 | Al-Stouhi |
| 2017/0003683 A1 | 1/2017 | Sato et al. |
| 2017/0061799 A1 | 3/2017 | Fujii et al. |
| 2017/0108865 A1 | 4/2017 | Rohde et al. |
| 2017/0124882 A1 | 5/2017 | Wang |
| 2017/0148327 A1 | 5/2017 | Sim |
| 2017/0171375 A1 | 6/2017 | Kamata |
| 2017/0183007 A1 | 6/2017 | Oh et al. |
| 2017/0197637 A1 | 7/2017 | Yamada et al. |
| 2017/0203763 A1 | 7/2017 | Yamada et al. |
| 2017/0203764 A1 | 7/2017 | Fujiki et al. |
| 2017/0240172 A1 | 8/2017 | Nishiguchi et al. |
| 2017/0240186 A1 | 8/2017 | Hatano |
| 2017/0243491 A1 | 8/2017 | Fujii et al. |
| 2017/0291603 A1 | 10/2017 | Nakamura |
| 2017/0308094 A1 | 10/2017 | Abe et al. |
| 2017/0313313 A1 | 11/2017 | Asakura |
| 2017/0315556 A1 | 11/2017 | Mimura |
| 2017/0334460 A1 | 11/2017 | Arakawa et al. |
| 2017/0341652 A1 | 11/2017 | Sugawara et al. |
| 2017/0341653 A1* | 11/2017 | Kubota ............ B60W 30/18154 |
| 2017/0349212 A1 | 12/2017 | Oshida et al. |
| 2017/0368936 A1 | 12/2017 | Kojima |
| 2018/0009437 A1* | 1/2018 | Ooba .................... B60W 30/12 |
| 2018/0029604 A1 | 2/2018 | Niino et al. |
| 2018/0033309 A1 | 2/2018 | Norwood |
| 2018/0037260 A1 | 2/2018 | Otake et al. |
| 2018/0043906 A1 | 2/2018 | Huang |
| 2018/0046185 A1 | 2/2018 | Sato et al. |
| 2018/0050659 A1 | 2/2018 | Coburn |
| 2018/0074497 A1 | 3/2018 | Tsuji et al. |
| 2018/0088574 A1 | 3/2018 | Latotzki et al. |
| 2018/0091085 A1 | 3/2018 | Tamagaki et al. |
| 2018/0111628 A1 | 4/2018 | Tamagaki et al. |
| 2018/0154939 A1 | 6/2018 | Aoki |
| 2018/0157038 A1* | 6/2018 | Kabe .................... G02B 5/3058 |

(56) References Cited

U.S. PATENT DOCUMENTS

| | | | |
|---|---|---|---|
| 2018/0162416 A1* | 6/2018 | Honda | B60W 40/04 |
| 2018/0170370 A1 | 6/2018 | Kataoka | |
| 2018/0178713 A1 | 6/2018 | Fujii | |
| 2018/0178714 A1 | 6/2018 | Fujii | |
| 2018/0178715 A1 | 6/2018 | Fujii | |
| 2018/0178716 A1 | 6/2018 | Fujii | |
| 2018/0178801 A1 | 6/2018 | Hashimoto et al. | |
| 2018/0178802 A1 | 6/2018 | Miyata | |
| 2018/0186376 A1 | 7/2018 | Lee et al. | |
| 2018/0188735 A1 | 7/2018 | Sugawara et al. | |
| 2018/0194280 A1 | 7/2018 | Shibata et al. | |
| 2018/0197414 A1 | 7/2018 | Oooka | |
| 2018/0209801 A1 | 7/2018 | Stentz et al. | |
| 2018/0215387 A1 | 8/2018 | Takae | |
| 2018/0215388 A1 | 8/2018 | Takae | |
| 2018/0222422 A1 | 8/2018 | Takae | |
| 2018/0222423 A1 | 8/2018 | Takae et al. | |
| 2018/0237030 A1 | 8/2018 | Jones et al. | |
| 2018/0239352 A1 | 8/2018 | Wang et al. | |
| 2018/0239358 A1 | 8/2018 | Choi et al. | |
| 2018/0251155 A1 | 9/2018 | Chan et al. | |
| 2018/0257669 A1* | 9/2018 | Makke | G09B 21/009 |
| 2018/0281788 A1 | 10/2018 | Uchida | |
| 2018/0290666 A1 | 10/2018 | Ichikawa et al. | |
| 2018/0292820 A1 | 10/2018 | Markberger | |
| 2018/0297638 A1 | 10/2018 | Fujii | |
| 2018/0297639 A1 | 10/2018 | Fujii | |
| 2018/0297640 A1 | 10/2018 | Fujii | |
| 2018/0339708 A1 | 11/2018 | Geller | |
| 2018/0345959 A1 | 12/2018 | Fujii | |
| 2018/0345960 A1 | 12/2018 | Fujii | |
| 2018/0345964 A1 | 12/2018 | Fujii et al. | |
| 2018/0346027 A1 | 12/2018 | Fujii | |
| 2018/0348758 A1 | 12/2018 | Nakamura et al. | |
| 2018/0350242 A1 | 12/2018 | Fujii | |
| 2018/0354519 A1 | 12/2018 | Miyata | |
| 2018/0362013 A1 | 12/2018 | Ungermann | |
| 2018/0370542 A1 | 12/2018 | Braunagel et al. | |
| 2018/0370544 A1 | 12/2018 | Kitagawa | |
| 2018/0373250 A1 | 12/2018 | Nakamura et al. | |
| 2019/0005823 A1 | 1/2019 | Fujiki et al. | |
| 2019/0026918 A1 | 1/2019 | Gomezcaballero et al. | |
| 2019/0047469 A1 | 2/2019 | Nishiguchi et al. | |
| 2019/0047561 A1 | 2/2019 | Nishiguchi et al. | |
| 2019/0049958 A1 | 2/2019 | Liu et al. | |
| 2019/0061766 A1 | 2/2019 | Nishiguchi | |
| 2019/0071099 A1 | 3/2019 | Nishiguchi | |
| 2019/0077411 A1 | 3/2019 | Oishi et al. | |
| 2019/0106108 A1 | 4/2019 | Wienecke et al. | |
| 2019/0126923 A1* | 5/2019 | Taie | B60W 30/09 |
| 2019/0126927 A1 | 5/2019 | Uejima | |
| 2019/0135290 A1 | 5/2019 | Marden et al. | |
| 2019/0155279 A1 | 5/2019 | Tayama | |
| 2019/0161117 A1 | 5/2019 | Suzuki | |
| 2019/0168754 A1 | 6/2019 | Makled et al. | |
| 2019/0185005 A1 | 6/2019 | Fukuda | |
| 2019/0196481 A1 | 6/2019 | Tay et al. | |
| 2019/0197497 A1 | 6/2019 | Abari et al. | |
| 2019/0212443 A1 | 7/2019 | Nomura et al. | |
| 2019/0235504 A1 | 8/2019 | Carter et al. | |
| 2019/0241158 A1 | 8/2019 | Ghannam et al. | |
| 2019/0241198 A1 | 8/2019 | Mori et al. | |
| 2019/0250620 A1 | 8/2019 | Huang et al. | |
| 2019/0256064 A1 | 8/2019 | Hecker et al. | |
| 2019/0263411 A1 | 8/2019 | Saikyo et al. | |
| 2019/0265712 A1 | 8/2019 | Satzoda et al. | |
| 2019/0279507 A1 | 9/2019 | Oshisaka et al. | |
| 2019/0283757 A1 | 9/2019 | Honda et al. | |
| 2019/0285726 A1 | 9/2019 | Moto | |
| 2019/0291642 A1 | 9/2019 | Chae et al. | |
| 2019/0291728 A1 | 9/2019 | Shalev-Shwartz et al. | |
| 2019/0302763 A1 | 10/2019 | Kondo et al. | |
| 2019/0302768 A1 | 10/2019 | Zhang et al. | |
| 2019/0315362 A1 | 10/2019 | Um et al. | |
| 2019/0317494 A1 | 10/2019 | Lee et al. | |
| 2019/0325758 A1 | 10/2019 | Yoshii et al. | |
| 2019/0359202 A1 | 11/2019 | Zhu et al. | |
| 2019/0391580 A1 | 12/2019 | Di Cairano et al. | |
| 2020/0001714 A1 | 1/2020 | Kojima | |
| 2020/0049513 A1 | 2/2020 | Ma | |
| 2020/0073396 A1 | 3/2020 | Shimizu | |
| 2020/0172123 A1 | 6/2020 | Kubota et al. | |
| 2020/0180638 A1 | 6/2020 | Kanoh | |
| 2020/0189618 A1 | 6/2020 | Ochida et al. | |
| 2020/0269747 A1 | 8/2020 | Kusayanagi et al. | |
| 2020/0269880 A1 | 8/2020 | Tokita | |
| 2020/0301431 A1 | 9/2020 | Matsubara et al. | |
| 2020/0307634 A1 | 10/2020 | Yashiro | |
| 2020/0312155 A1 | 10/2020 | Kelkar et al. | |
| 2020/0339128 A1 | 10/2020 | Kanoh | |
| 2020/0391593 A1 | 12/2020 | Lee et al. | |
| 2021/0188258 A1 | 6/2021 | Goto et al. | |
| 2021/0188262 A1 | 6/2021 | Goto et al. | |
| 2021/0188356 A1 | 6/2021 | Goto et al. | |

FOREIGN PATENT DOCUMENTS

| | | |
|---|---|---|
| DE | 102004005815 B3 | 6/2005 |
| DE | 10 2004 048 468 A1 | 4/2006 |
| DE | 10 2007 005 245 A1 | 11/2007 |
| DE | 10 2011 016 770 A1 | 11/2011 |
| DE | 10 2011 016 771 A1 | 10/2012 |
| DE | 10 2012 001 405 A1 | 11/2012 |
| DE | 10 2011 109618 A1 | 2/2013 |
| DE | 10 2012 008090 A1 | 10/2013 |
| DE | 10 2014 200 896 A1 | 7/2015 |
| DE | 10 2014 225 680 A1 | 6/2016 |
| DE | 10 2015 205131 A1 | 9/2016 |
| DE | 102016202946 A1 | 9/2016 |
| DE | 102015206969 A1 | 10/2016 |
| DE | 102015209476 A1 | 11/2016 |
| DE | 102015219231 A1 | 4/2017 |
| DE | 10 2016 007187 A1 | 6/2017 |
| DE | 102015224244 A1 | 6/2017 |
| DE | 10 2016 215565 A1 | 2/2018 |
| DE | 10 2016 216134 A1 | 3/2018 |
| EP | 1074904 A1 | 2/2001 |
| EP | 1607264 A1 | 12/2005 |
| EP | 2116984 A1 | 11/2009 |
| EP | 2657921 A1 | 10/2013 |
| EP | 2978648 A1 | 2/2016 |
| EP | 3075618 A2 | 10/2016 |
| EP | 3239960 A1 | 11/2017 |
| EP | 3 264 211 A1 | 1/2018 |
| EP | 3284646 A1 | 2/2018 |
| EP | 3075618 A3 | 5/2018 |
| EP | 19167267.4 | 8/2021 |
| JP | 2000-020898 A | 1/2000 |
| JP | 2000-198458 A | 7/2000 |
| JP | 2003-025868 A | 1/2003 |
| JP | 2008-515701 A | 5/2008 |
| JP | 2009-184554 A | 8/2009 |
| JP | 2015-066962 A | 4/2015 |
| JP | 2015-075889 A | 4/2015 |
| JP | 2015-138330 A | 7/2015 |
| JP | 2016-000602 A | 1/2016 |
| JP | 2016-011031 A | 1/2016 |
| JP | 2016-071513 A | 5/2016 |
| JP | 2016-151815 A | 8/2016 |
| JP | 2016-196285 A | 11/2016 |
| JP | 2016-207060 A | 12/2016 |
| JP | 2017-062696 A | 3/2017 |
| JP | 2017-100681 A | 6/2017 |
| JP | 2017-134664 A | 8/2017 |
| JP | 2017-138899 A | 8/2017 |
| JP | 2017-165322 A | 9/2017 |
| JP | 2017-210034 A | 11/2017 |
| JP | 2017-217969 A | 12/2017 |
| JP | 2018-047737 A | 3/2018 |
| JP | 2019-043169 A | 3/2019 |
| KR | 10-0578573 B | 11/2005 |
| KR | 10-2011-0065013 A | 6/2011 |
| KR | 10-2014-0082279 A | 7/2014 |
| KR | 10-1439017 B1 | 10/2014 |

(56) References Cited

FOREIGN PATENT DOCUMENTS

| | | |
|---|---|---|
| KR | 10-2016-0004835 A | 1/2016 |
| KR | 10-2016-0023850 A | 3/2016 |
| KR | 101779823 B1 | 10/2017 |
| KR | 10-2018-0022900 A | 3/2018 |
| KR | 10-2018-0023981 A | 3/2018 |
| KR | 20180070401 A | 6/2018 |
| KR | 2018-0095240 A | 8/2018 |
| WO | 2010-088869 A1 | 8/2010 |
| WO | 2012-131405 A1 | 10/2012 |
| WO | 2014-154771 A1 | 10/2014 |
| WO | 2017-018133 A1 | 2/2017 |
| WO | WO 2017064941 A1 | 4/2017 |
| WO | 2017-168013 A1 | 10/2017 |
| WO | WO 2017168013 A1 | 10/2017 |
| WO | 2018-033389 A1 | 2/2018 |
| WO | 2017-017793 A1 | 6/2018 |

OTHER PUBLICATIONS

Office Action dated Dec. 14, 2020 from the corresponding U.S. Appl. No. 16/378,203, 49 pp.
Notice of Allowance dated Dec. 28, 2020 from the corresponding U.S. Appl. No. 16/206,170, 16 pp.
Office Action dated Jan. 25, 2021 from the corresponding U.S. Appl. No. 16/192,279, 38 pp.
Notice of Allowance dated Jan. 25, 2021 from the corresponding U.S. Appl. No. 16/372,937, 31 pp.
Office Action dated Jan. 27, 2021 from the corresponding U.S. Appl. No. 16/299,547, 29 pp.
Office Action dated Feb. 11, 2021 from the corresponding U.S. Appl. No. 16/372,896, 26 pp.
Office Action dated Feb. 11, 2021 from the corresponding U.S. Appl. No. 16/376,661, 24 pp.
Office Action dated Feb. 17, 2021 from the corresponding U.S. Appl. No. 16/204,324, 30 pp.
Office Action dated Feb. 17, 2021 from the corresponding U.S. Appl. No. 16/376,576, 56 pp.
European Search Report dated Mar. 27, 2020 from the corresponding European Application No. 19167264.1, 8 pages.
European Search Report dated Apr. 21, 2020 from the corresponding European Application No. 19167270.8, 8 pages.
U.S. Office Action dated Feb. 4, 2020 from the corresponding U.S. Appl. No. 16/296,890, 19 pp.
U.S. Office Action dated Mar. 25, 2020 from the corresponding U.S. Appl. No. 16/204,362, 27 pp.
U.S. Office Action dated Apr. 24, 2020 from the corresponding U.S. Appl. No. 16/203,884, 25 pp.
European Search Report dated May 11, 2020 from the corresponding European Application No. 19167265.8, 9 pages.
Office Action for U.S. Appl. No. 16/204,400 dated Jun. 1, 2020, 44 pages.
Notice of Allowance for U.S. Appl. No. 16/204,362 dated Jul. 9, 2020, 21 pages.
European Search Report dated Jul. 1, 2019 from the corresponding European Application No. 18210398.6, 9 pages.
European Search Report dated Jul. 3, 2019 from the corresponding European Application No. 18210063.6, 10 pages.
European Search Report dated Jul. 18, 2019 from the corresponding European Application No. 18210400.0, 5 pages.
European Search Report dated Jul. 22, 2019 from the corresponding European Application No. 18210403.4, 8 pages.
European Search Report dated Jul. 22, 2019 from the corresponding European Application No. 18210401.8, 8 pages.
European Search Report dated Jul. 25, 2019 from the corresponding European Application No. 18209168.6, 9 pages.
European Search Report dated Jul. 25, 2019 from the corresponding European Application No. 19156387.3, 8 pages.
European Search Report dated Aug. 2, 2019 from the corresponding European Application No. 19167271.6, 8 pages.
European Search Report dated Aug. 22, 2019 from the corresponding European Application No. 19167263.3, 8 pages.
European Search Report dated Aug. 30, 2019 from the corresponding European Application No. 19167269.0, 9 pages.
European Search Report dated Aug. 30, 2019 from the corresponding European Application No. 19167267.4, 8 pages.
European Search Report dated Oct. 2, 2019 from the corresponding European Application No. 19163402.1, 10 pages.
European Search Report dated Oct. 2, 2019 from the corresponding European Application No. 19162795.9, 8 pages.
European Search Report dated Oct. 14, 2019 from the corresponding European Application No. 19161253.0, 11 pages.
European Search Report dated Oct. 18, 2019 from the corresponding European Application No. 19167268.2, 8 pages.
European Search Report dated Oct. 23, 2019 from the corresponding European Application No. 19167266.6, 9 pages.
U.S. Office Action for U.S. Appl. No. 16/204,362 dated Oct. 16, 2019, 32 pages.
Office Action dated Aug. 12, 2020 from the corresponding U.S. Appl. No. 16/192,279, 60 pages.
Notice of Allowance dated Sep. 4, 2020 from the corresponding U.S. Appl. No. 16/203,884, 15 pages.
Office Action dated Sep. 15, 2020 from the corresponding U.S. Appl. No. 16/206,170, 23 pages.
U.S. Appl. No. 16/299,547, filed Mar. 12, 2019.
U.S. Appl. No. 16/367,433, filed Mar. 28, 2019.
U.S. Appl. No. 16/372,896, filed Apr. 2, 2019.
U.S. Appl. No. 16/372,966, filed Apr. 2, 2019.
U.S. Appl. No. 16/376,576, filed Apr. 5, 2019.
U.S. Appl. No. 16/376,612, filed Apr. 5, 2019.
U.S. Appl. No. 16/378,181, filed Apr. 8, 2019; and.
U.S. Appl. No. 16/378,203, filed Apr. 8, 2019.
Office Action dated Mar. 17, 2021 from the corresponding U.S. Appl. No. 16/378,181, 14 pp.
Notice of Allowance dated Mar. 23, 2021 from the corresponding U.S. Appl. No. 16/269,140, 9 pp.
Office Action dated Mar. 26, 2021 from the corresponding U.S. Appl. No. 16/376,612, 29 pp.
Office Action dated Apr. 22, 2021 from the corresponding U.S. Appl. No. 16/378,203, 35 pp.
Notice of Allowance dated May 19, 2021 from the corresponding U.S. Appl. No. 16/204,324, 13 pp.
Office Action dated May 21, 2021 from the corresponding U.S. Appl. No. 16/372,896, 19 pp.
Notice of Allowance dated May 27, 2021 from the corresponding U.S. Appl. No. 16/376,661, 10 pp.
Office Action dated Jun. 1, 2021 from the corresponding U.S. Appl. No. 16/192,279, 39 pp.

* cited by examiner

| | FUNCTION STATE | CLUSTER (MAIN) | CLUSTER (SIMPLIFICATION) | NOTE |
|---|---|---|---|---|
| STATE OF LANE CHANGE ASSISTANCE FUNCTION | OFF (NON-DISPLAY) | ☐ | ☐ | -NON-DISPLAY |
| | STANDBY | ⇕ | ⇕ | -VISUAL |
| | READY | ⇕ | ⇕ | -VISUAL |
| | ACTIVE | ⇕ | ⇕ | -VISUAL BLINKING |
| | CANCEL | ⇕ | ⇕ | -VISUAL BLINKING+TACTILE OR VISUAL BLINKING+AUDITORY (SELECTABLE) |
| | FAIL | ⇕ | ⇕ | -IMMEDIATELY AFTER OCCURRENCE: VISUAL+TACTILE OR VISUAL+AUDITORY (SELECTABLE)  -THEREAFTER: VISUAL |

FIG. 4

APPARATUS FOR DISPLAYING DRIVING STATE OF VEHICLE, SYSTEM INCLUDING THE SAME AND METHOD THEREOF

CROSS-REFERENCE TO RELATED APPLICATION

The present application claims priority to and the benefit of U.S. Patent Application No. 62/655,831, filed on Apr. 11, 2018 in the U.S. Patent Office and Korean Patent Application No. 10-2018-0157360, filed on Dec. 7, 2018, in the Korean Intellectual Property Office, which is incorporated herein in its entirety by reference.

TECHNICAL FIELD

The present disclosure relates to an apparatus for displaying a driving state of a vehicle, a system including the same and a method thereof, and more particularly, to a technology of displaying a state of a lane change assistance function.

BACKGROUND

The statements in this section merely provide background information related to the present disclosure and may not constitute prior art.

Recently, a system for assisting the driving of a vehicle such as an advanced driver assistance system (ADAS) has been developed and spotlighted in the automobile industry.

Such an advanced driver assistance system assists the vehicle driving, rather than the driver, and assists the lane change of a vehicle or the like by using various sensors and advanced logic.

In particular, when the lane change of a vehicle is assisted, the state of a lane change function such as normal operation, restriction, interruption, and like is changed from time to time depending on a surrounding situation and a current state of the vehicle. In this case, there is a need to accurately inform the driver of the change in a state of the lane change function, thereby allowing the driver to response safely to it.

SUMMARY

The present disclosure provides an apparatus for displaying a driving state of a vehicle, which is capable of accurately determining a change in a state of a lane change assistance function and promptly and quickly displaying the state change to allow a user to know the state change, a system including the same, and a method thereof.

In one aspect of the present disclosure, an apparatus for displaying a driving state of a vehicle is provided, which includes a processor that determines a change in a state of a lane change assistance function and controls a step-by-step notification based on the change in the state of the lane change assistance function, and a display controlled by the processor to display the step-by-step notification based on the change in the state of the lane change assistance function.

The state of the lane change assistance function may include at least one of a first state in which the lane change assistance function is turned off to be disabled, a second state in which a vehicle enters an operating section of the lane change assistance function, a third state in which a lane changeable condition is unmet, a fourth state in which the lane changeable condition is met, a fifth state in which a lane change is able to be performed, a sixth state in which a lane change cancel condition is met, and a seventh state in which a failure condition of the lane change assistance function is met.

The processor may control the display to separately display each of the first to seventh states by using at least one of a symbol, whether a light is turned on, a light color, whether a light is blinked, and a blink rate.

The processor may control the display to output a screen without displaying the lane change assistance function in the first state, turn on a symbol of the lane change assistance function in a first color in the second state, turn on the symbol of the lane change assistance function in a color different from the first color in the third state, and turn on and blink the symbol of the lane change assistance function in the fourth state.

The processor may perform a notification by using at least one of visual, tactile and auditory outputs in the sixth or seventh state.

The processor may immediately perform a notification by using a tactile or auditory output together with a visual output when a transition to the sixth or seventh state is performed, and stop the tactile or auditory output and maintain the visual output after a preset time elapses.

The processor may perform the tactile output through a steering wheel haptic or a seat vibration, and perform the auditory output through a beep or voice guidance.

The processor may determine that a sensor is in normal operation and transition the lane change assistance function from the first state to the second state when information about a surrounding object, which is received at a position apart by a specified distance or more rearward of the vehicle, exists when a sensor measured value is received after the vehicle starts.

The processor may transition the lane change assistance function to the fifth state when a user input is generated in the fourth state and a risk of collision does not exist, and transition the lane change assistance function to the fourth state when a lane change is completed in the fifth state.

The processor may determine that the failure condition of the lane change assistance function is met and transition the lane change assistance function from the first state to the seventh state when a sensor fails or when an error occurs in a controller area network (CAN) signal when the lane change assistance function is performed.

The processor may transition the lane change assistance function from the second state to the third state when a lane change-on operation is performed and an object by which activation of the lane change assistance function is impossible is not sensed in a lane change-off operation state, or when, in the change-on operation state, a lateral control-off operation state is transitioned to a later control-on operation state and, the object by which activation of the lane change assistance function is impossible is not sensed.

The processor may determine whether the lane changeable condition is met by using one or more of whether a lane exists, a curvature of a road on which the vehicle travels, a current speed of the vehicle, whether a lateral control is operated, and road condition.

The processor may determine that the lane changeable condition is met when a lane exists and the vehicle travels on a road having a curvature equal to or less than a lane change limiting curvature, when the vehicle travels at a lane changeable speed, when a lateral control is operated, and when the road is not a road on which a lane change is impossible within a specified distance in front of the vehicle or at a current vehicle location.

The processor may determine that the lane change cancel condition is met when at least one of cases is met, wherein the cases include a case where an emergency light switch is turned on before the vehicle crosses a lane mark, a case where a user setting menu (USM) is turned off before the vehicle crosses the lane mark, a case where a hands-off is sensed before the vehicle crosses a lane mark, a case where a speed of the vehicle deviates from a lane changeable speed before the vehicle crosses a lane mark, a case where a forward collision-avoidance assist (FCA) or a blind-spot collision-avoidance assist (BCA), which is a safety system, is operated before the vehicle crosses a lane mark, a case where a lane mark disappears, a case where the vehicle does not cross a lane mark within a specified period of time after a turn light signal is input, a case where the vehicle crosses a lane mark within the specified period of time after the turn light signal is input, a case where the vehicle does not get out of a lane mark even through a specified period of time elapses after the vehicle crosses the lane mark, a case where a lateral control is released, and a case where collision with a nearby vehicle is expected.

The processor may transition the lane change assistance function from the third state to the second state when the vehicle is in a lane change-off operation state, or an object by which activation of the lane change assistance function is impossible is sensed.

The processor may control the display to output a pop-up window for confirming to a user whether to enter a lane change operation mode when a lane change-on operation is performed in transition from the first state to the second state, or the object disappears in a state where the object by which activation of the lane change assistance function is impossible is sensed such that the third state is transitioned to the second state.

In another aspect of the present disclosure, a vehicle system is provided, which includes a vehicle driving state display device configured to determine a change in a state of a lane change assistance function and output a step-by-step notification based on the change in the state of the lane change assistance function, and a tactile output device or an auditory output device controlled by the vehicle driving state display device, wherein the tactile output device is configured to tactually output the step-by-step notification, and the auditory output device is configured to auditorily output the step-by-step notification.

The step-by-step notification may be separately displayed by using at least one of a symbol, whether a light is turned on, a light color, whether a light is blinked, and a blink rate.

The tactile output device may output a steering wheel haptic or a seat vibration, and the auditory output device may output a beep or voice guide.

According to still another aspect of the present disclosure, there is provided a method of displaying a driving state of a vehicle, which includes determining a change in a state of a lane change assistance function by using at least one of whether a sensor is in normal operation, a lane changeable condition and a lane change cancel condition, outputting a step-by-step notification based on the change in the state of the lane change assistance function.

According to the present technology, it may be possible to accurately determine the change in the state of the lane change assistance function and promptly and rapidly display the change to allow a user to know the change state of the lane change assistance function, thereby improving the convenience of the user.

In addition, various effects that are directly or indirectly understood through the present disclosure may be provided.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4 is a view illustrating an example of a method of displaying each lane change assistance function state in one form of the present disclosure;

Figure 1:
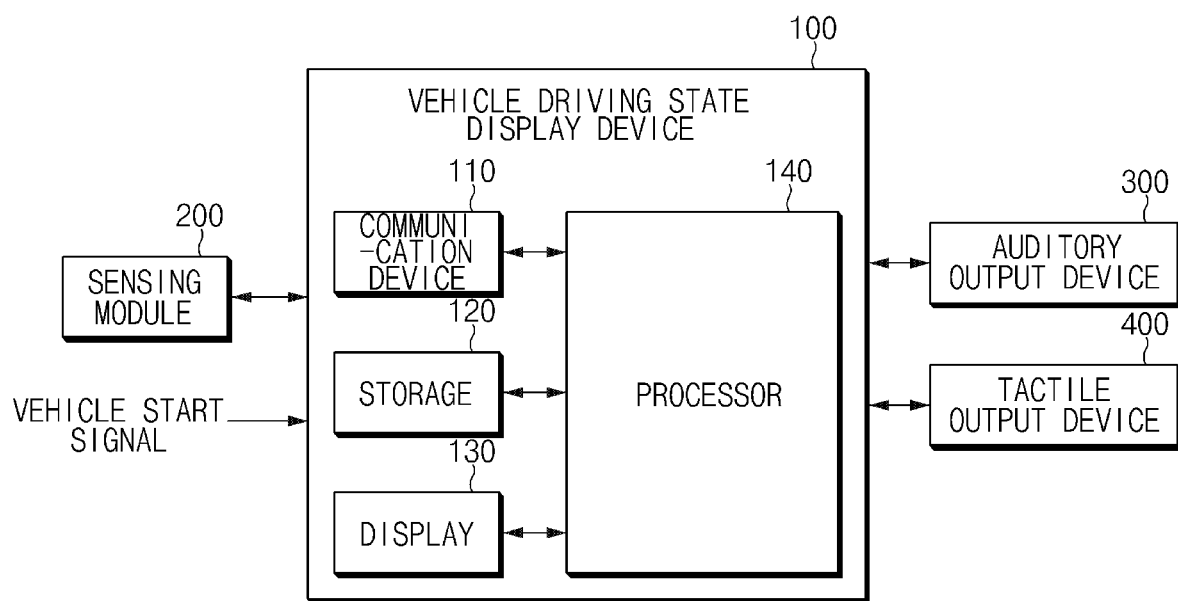
FIG. 1 is a block diagram illustrating a configuration of an apparatus for displaying a driving state of a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the present disclosure, terms like first, second, "A", "B", (a), and (b) may be used. These terms are intended solely to distinguish one component from another, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure provides a configuration for accurately determining a change in state transition of a lane change assistance function when a lane change assistance function is operated and promptly informing a user of the state change, thereby allowing a user to accurately and quickly recognize the state change.

Hereinafter, some forms of the present disclosure will be described in detail with reference to FIGS. 1 to 11.

Figure 2:
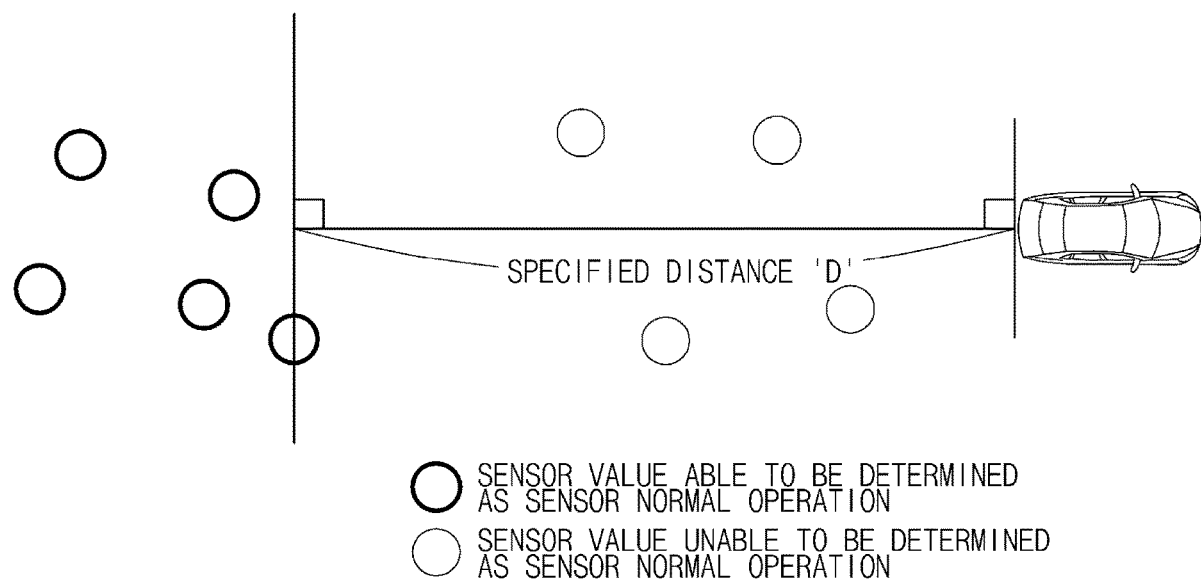
FIG. 2 is a view illustrating a method of determining an operation state of a sensor in one form of the present disclosure.

FIG. 1 is a block diagram illustrating a configuration of a vehicle system including a vehicle driving state display device in some forms of the present disclosure. FIG. 2 is a view illustrating a method of determining an operation state of a sensor in some forms of the present disclosure.

Referring to FIG. 1, a vehicle system in some form of the present disclosure may include a vehicle driving state display device 100, a sensing module 200, a the auditory output device 300, and a tactile output device 400.

The vehicle driving state display device 100 determines a lane change assistant state according to whether a sensor is normally operated, a failure condition of a lane change function, a lane changeable condition, a lane change cancel condition, whether a risk of collision exists, whether a lane change is completed, and the like, and controls a step-by-step notification according to a change in a state of the lane change assistance function.

The state of the lane change assistance function may include at least one of a first state (off state) in which the lane change assistance function is turned off to be disabled, a second state (operation section entrance state) in which a vehicle enters an operating section of the lane change assistance function, a third state (standby state) in which a lane changeable condition is unmet, a fourth state (ready state) in which the lane changeable condition is met, a fifth state (active state) in which a lane change is able to be performed, a sixth state (cancel state) in which a lane change cancel condition is met, and a seventh state (failure state) in which a failure condition of the lane change assistance function is met.

The off state of the lane change assistance function means a state where the lane change assistance function is turned off so that the operation is impossible. The operation section entrance state of the lane change assistance function means a state in which the lane change assistance function is operable.

When the lane change assistance function is in the standby state, it means a state in which the lane changeable condition is unmet, and when the lane changing assistance function is in the ready state, it means a state in which the lane changeable condition is met. That is, when the lane change assistance function is in the standby state, it means a state in which at least one of the lane changeable conditions is not met, and when the lane change assistance function is in the ready state, it means a state in which all the lane changeable conditions are met. When the lane change assistance function is in the active state, it means a state in which the lane change is performable so that the lane change operation may be performed in the active state. When the lane change assistance function is in the cancel state, it means a state in which at least one of the lane change cancellation conditions is met, and when the lane change assistance function is in the fail state, it means a state in which the failure condition of the lane change assistance function is met, so that it is impossible to operate the system performing the lane change assistance function.

The vehicle driving state display device 100 may include a communication device 110, storage 120, a display 130, and a processor 140.

The communication device 110, which is a hardware device implemented by various electronic circuits for transmitting and receiving a signal through a wireless or wired connection, may perform the communication in a vehicle through CAN communication, LIN communication, or the like in the present disclosure and may communicate with the sensing module 200, the auditory output device 300, the tactile output device 400, and the like.

The storage 120 may store the sensing result of the sensing module 200, the result of determining the state of the lane change assistance function obtained by the processor 140, and the like. The storage 120 may include a storage medium having at least one type of a flash memory type, a hard disk type, a micro type, a card type of a memory (for example, an SD, XD memory, or the like), RAM (Random Access Memory), SRAM (Static RAM), ROM (Read-Only Memory), EEPROM (Electrically Erasable Programmable Read-Only Memory), PROM (Programmable Read-Only Memory), MRAM (Magnetic RAM), a magnetic disc, and an optical disc.

The display 130 may be controlled by the processor 140 to display a step-by-step notification based on the change in the state of the lane change assistance function and to display a symbol (icon) indicating the state of the lane change assistance function by turning on or blinking the symbol, or by changing the color of the symbol based on the change in the state of the lane change assistance function. A detailed display example according to the state of the lane change assistance function will be described later with reference to FIGS. 4 to 10. The display 130 may be implemented as a head-up display (HUD), a cluster, an audio video navigation (AVN), or the like. In addition, the display 130 may include at least one of a liquid crystal display (LCD), a thin film transistor liquid crystal display (TFT LCD), a light emitting diode (LED), an organic light emitting diode (OLED), an active matrix OLED (AMOLED), a flexible display, a bended display, and a three-dimensional (3D) display. Some of these displays may be implemented as transparent displays that are transparent or optically transparent to allow viewing of an outside. In addition, the display 130 may be provided as a touch screen including a touch panel, and may be used as an input device as well as an output device. Although an example in which the display 130 is included in the vehicle driving state display device 100 is described in the present disclosure, the form of the disclosure is not limited thereto and the display 130 may be implemented as a display device which is already mounted in a vehicle and is independent separated from the communication device 110, the storage 120, and the processor 140.

The processor 140 may be electrically connected to the communication device 110, the storage 120, the display 130, and the like, and may electrically control each component. The processor 140 may be an electric circuit that executes software commands and may perform various data processing and calculations described below.

The processor 140 may determine the change in the state of the lane change assistance function and control a step-by-step notification based on the change in the state of the lane change assistance function.

The processor 140 may control to separately display each of the first to seventh states by using at least one of a symbol, whether a light is turned on, a light color, whether a light is blinked, and a blink rate.

The processor 140 may control the display 130 to output a screen without displaying the lane change assistance function in the first state, turn on a symbol of the lane change assistance function in a first color in the second state, turn on the symbol of the lane change assistance function in a color different from the first color in the third state, and turn on and blink the symbol of the lane change assistance function in the fourth state. The processor 140 may control the display 130 to blink the symbol of the lane change assistance function in the fifth state while turning on the symbol of the lane change assistance function in a color different from those in the second and third states. In addition, the processor 140 may control the display 130, the auditory output device 300, and the tactile output device 400 to perform the notification by using at least one of visual, tactile and auditory outputs in the sixth or seventh state. An example of a visual output for each state will be described in more detail later with reference to FIGS. 4 to 9.

The processor 140 may increase the speed of the blinking period of the display 130 immediately after transition to the fifth state which is an active state, and gradually decrease the speed of the blinking period as the lane change proceeds. Thus, the processor 140 may visually inform the user of the lane change progress information through the blinking cycle change. That is, since the lane change is more dangerous in the driving situation than the lane maintenance, the processor 140 may speed up the blinking at the start time point of the lane change to inform the user of the situation. In addition, since the completion of the lane change of the vehicle means the transition to the lane maintenance state (the safer situation in the driving situation), the processor 140 may speed down the blinking to inform the user of the situation.

In addition, when the lane change is canceled so that the vehicle returns to the original lane along a cancel path, the processor 140 may gradually decrease the blinking speed in the lane change cancel situation in the same manner as the lane change activation state, and may inform the user of the dangerous situation by continuously increasing the blinking speed in a situation where the lane change is cancelled due to the dangerous situation such as the release of the lateral control. However, it is possible to output the auditory output or tactile output equally.

Referring to FIG. 2, when the processor 140 receives a sensor measurement value after the start of the vehicle, the processor 140 may determine that the sensor is normally operated when there is information about a surrounding object at least once, which is received at a specified distance (e.g., 55 m) or more rearward of the vehicle, and may transition the lane change assistance function from the first state to the second state.

When a lane change-on operation is performed and an object by which activation of the lane change assistance function is impossible is not sensed in a lane change-off operation state, or when, in the lane change-on operation state, a lateral control-off operation state is transitioned to a lateral control-on operation state and, the object by which activation of the lane change assistance function is impossible is not sensed, the processor 140 may transition the lane change assistance function from the second state to the third state.

The processor 140 may transition the lane change assistance function from the third state to the fourth state when the vehicle changeable condition is met, and may transition the lane change assistance function to the fifth state when a user input (e.g., a turn signal lamp is turned on) occurs in the fourth state and there is no risk of collision. In this case, the processor 140 may determine that there is no risk of collision when the collision estimated time (TTC) with the surrounding vehicle exceeds a reference time and the distance from the surrounding vehicle exceeds a reference distance. In addition, when the risk of collision occurs in the state in which the turn signal lamp is turned on, the transition to the fifth state may be impossible.

In addition, when the lane change is completed in the fifth state, the processor 140 may transition the lane change assistance function to the fourth state. In this case, the processor 140 may determine that the lane change is completed when the vehicle enters a specified range of the center of the target lane or the lane change path ends.

In addition, when the lane change cancel condition is met during the lane change in the fifth state, the processor 140 may immediately transition to the sixth state which is the cancel state and outputs a notification.

The processor 140 may determine that the failure condition of the lane change assistance function is met when the sensor fails or when the CAN communication signal is abnormally generated when the lane change assistance function is performed, and may transition from the first state to the seventh state. The processor 140 may transition the lane change assistance function from the third state to the second state when the lane change assistance function is in the lane change-off operation state or when an object by which the activation of the lane change assistance function is impossible is sensed.

The processor 140 may determine whether the lane changeable condition is met by using one or more of whether a lane exists, a curvature of a road on which the vehicle travels, a current speed of the vehicle, whether the lateral control is operated, and road condition.

The processor 140 may determine that the lane changeable condition is met when a lane exists and the vehicle travels on a road having a curvature equal to or less than a lane change limiting curvature, when the vehicle travels at a lane changeable speed, when a lateral control is operated, and when it is not a road on which a lane change is impossible within a specified distance in front of the vehicle or at a current vehicle location.

The processor 140 may determine that the lane change cancel condition is met when at least one of cases is met, where the cases include a case where an emergency light switch is turned on before the vehicle crosses a lane mark, a case where a user setting menu (USM) is turned off before the vehicle crosses a lane mark, a case where a hands-off is sensed before the vehicle crosses a lane mark, a case where a speed of the vehicle deviates from a lane changeable speed before the vehicle crosses a lane mark, a case where a forward collision-avoidance assist (FCA) or a blind-spot collision-avoidance assist (BCA), which is a safety system, is operated before the vehicle crosses a lane mark, a case where a lane mark disappears, a case where the vehicle does not cross a lane mark within a specified period of time after a turn light signal is input, a case where the vehicle crosses a lane mark within the specified period of time after the turn light signal is input, a case where the vehicle does not get out of a lane mark even through a specified period of time elapses after the vehicle steps on the lane mark, a case where a lateral control is released, and a case where collision with a nearby vehicle is expected. In this case, the vehicle driving state display device 100 may determine that the vehicle is in the hands-off state when the driver's steering torque is lower than a hands-off reference torque for a specified time, and may determine that the driver has willingness to operate directly (override) when the driver's steering torque exceeds a reference torque.

The sensing module 200 may include a plurality of sensors for sensing an object outside the vehicle, and may obtain information about a location, a speed, a moving direction and/or a kind of an external object (e.g., a vehicle, a pedestrian, a bicycle, a motorcycle, or the like). To this end, the sensing module 200 may include an ultrasonic sensor, a radar, a camera, a laser scanner and/or a corner radar, a lidar, an acceleration sensor, a yaw rate sensor, a torque measurement sensor, a wheel speed sensor, a steering angle sensor, and the like.

The auditory output device 300 is controlled by the vehicle driving state display device 100 to perform auditory output through beep sound or voice guidance. In this case, the vehicle driving state display device 100 may differently adjust the volume or tone of the auditory output through the auditory output device 300 to notify the state change of the lane change assistance function step by step.

The tactile output device 400 may be controlled by the vehicle driving state display device 100 to perform tactile output through steering wheel haptic or seat vibration. In this case, the vehicle driving state display device 100 may adjust the intensity of the vibration through the tactile output device 400 to notify the state change of the lane change assistance function step by step.

Figure 3:
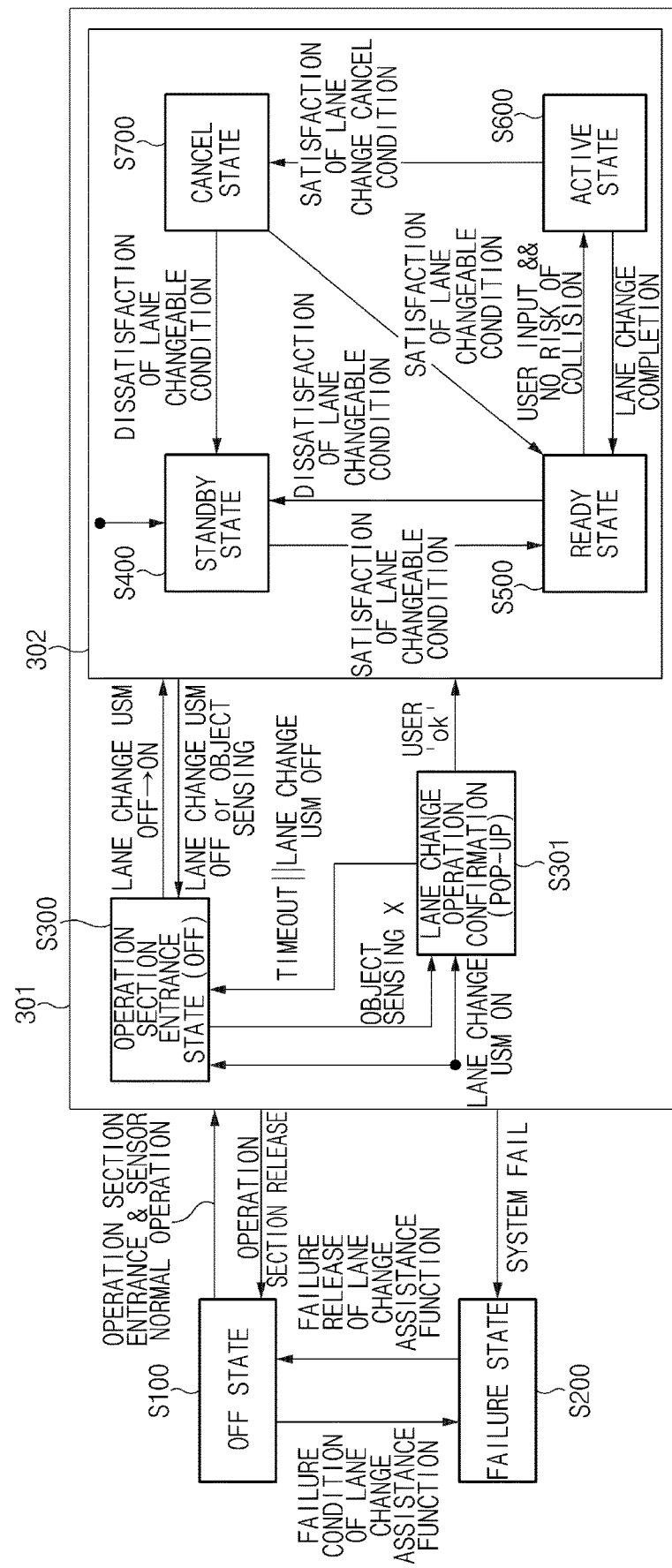
FIG. 3 is a view illustrating an exemplary operation of a state transition of a lane change assistance function in one form of the present disclosure.

FIG. 3 is a view illustrating an exemplary operation of a state transition of a lane change assistance function in some forms of the present disclosure.

Referring to FIG. 3, when the vehicle starts up and the lane change assistance function is in an off state in operation S100, the vehicle driving state display device 100 determines whether the system failure condition is met. When the failure condition of the lane change assistance function is met, in operation S200, the lane change assistance function is transitioned to the failure state. Then, when the failure condition of the lane change assistance function is released, in operation S100, the lane change assistance function state is transitioned to the off state again. In this case, the failure condition of the lane change assistance function may include whether the sensing module (e.g., a front radar, a front camera, a rear side radar, and the like) 200 is out of order, and whether at least one of CAN signals is faulty.

The vehicle driving state display device 100 may determine whether the vehicle enters the operation section by determining whether the sensor is normally operated in the off state. When the sensor is normally operated, in operation S300, the vehicle driving state display device 100 may transition the lane change assistance function from the off state to the operation section entrance state.

In the operation section entrance state, since the vehicle driving state display device 100 is in a state where the lane change assistance function has already been turned on through the lane change user setting menu (USM), when an object by which it is impossible to activate the lane change assistance function disappears, in operation S301, a lane change operation screen popup window is displayed to confirm again whether the user is willing to change the lane.

Thus, when the user presses confirmation in the pop-up window, in operation S400, the state of the lane change assistance function is transitioned to the standby state. Meanwhile, when the user exceeds the time to press confirmation in the pop-up window or turns off the lane change assistance function through the lane change USM, in operation S300, the state of the lane change assistance function is transitioned to the operation section entrance state again.

Meanwhile, when the lane change-on operation is performed through the lane change USM in the off state of the lane change assistance function and an object by which it is impossible to activate the lane change assistance function is not sensed, in operation S400, the vehicle driving state display device 100 transitions the state of the lane change assistance function from the operation section entrance state to the standby state. In addition, in operation S400, when the lateral control is turned on and an object by which it is impossible to activate the lane change assistance function is not sensed in the state in which the lane change assistance function is turned on through the lane change USM, the vehicle driving state display device 100 transitions the state of the lane change assistance function from the operation section entrance state to the standby state.

In the standby state, in operation S300, the vehicle driving state display device 100 allows the state of the lane change assistance function to return to the operation section entrance state when a lane change USM off operation is performed or an object (e.g., a pedestrian, a cyclist) by which it is impossible to activate the lane change assistance function is sensed.

In the standby state, in operation S500, the vehicle driving state display device 100 may determine whether the lane changeable condition is met and may transition the state of the lane change assistance function to the ready state when the lane changeable condition is met. In this case, the lane changeable condition may include whether a lane exists, whether the current vehicle speed is in a lane changeable vehicle speed range, whether the lateral control is being operated, and road condition. The road condition may include whether the lane change assistance function is operable on a road (e.g., a driveway, an expressway, a high speed way, or the like), whether the lane change assistance function is not operable on a road (e.g., a highway exit point, a tunnel, a toll gate, an interchange (IC), a junction change (JC), or the like), whether the curvature of the current road is less than or equal to a specified reference value, and the like. That is, the vehicle driving state display device 100 determines that the lane changeable condition is met in cases where a lane exists, the current speed of the vehicle is in the lane changeable range, the vehicle travels on a road having a curvature equal to or less than a lane change limiting curvature, the lateral control is operated, and it is not a road on which a lane change is impossible within a specified distance in front of the vehicle or at a current vehicle location.

In the ready state, in operation S400, the vehicle driving state display device 100 continuously checks the lane changeable condition, and when the lane changeable condition is not met, the state of the lane change assistance function is returned to the standby state again. In this case, the vehicle driving state display device 100 determines that the lane changeable condition is not met when at least one of the lane changeable conditions is not met.

In the ready state, in operation S600, the vehicle driving state display device 100 determines whether a user input (e.g., turning on/off of turn signal lamp) occurs and whether the risk of collision exists, and transitions the state of the lane change assistance function to the active state when the user input occurs and there is no risk of collision.

In this case, the occurrence of the user input may include a state in which the turn signal lamp is turned on, and the vehicle driving state display device 100 may determine that there is no risk of collision when the collision estimated time (TCC) is greater than or equal to a reference time and a distance from a surrounding vehicle is greater than or equal to a reference distance.

When the lane change assistance function is in the active state, the lane change may be performed.

In the active state, the vehicle driving state display device 100 determines whether the lane change is completed, and when the lane change is completed, the state of the lane change assistance function is returned to the ready state (S500).

In the active state, in operation S700, the vehicle driving state display device 100 determines whether the lane change cancellation condition is met, and transitions the state of the lane change assistance function to the cancel state when the lane change cancellation condition is met. In this case, the lane change cancel condition includes a case which satisfies at least one of cases which includes a case where an emergency light switch is turned on before the vehicle crosses a lane mark, a case where a user setting menu (USM) is turned off before the vehicle crosses a lane mark, a case where a hands-off is sensed before the vehicle crosses a lane mark, a case where a speed of the vehicle deviates from a lane changeable speed before the vehicle crosses a lane mark, a case where a forward collision-avoidance assist (FCA) or a blind-spot collision-avoidance assist (BCA), which is a safety system, is operated before the vehicle crosses a lane mark, a case where a lane mark disappears, a case where the vehicle does not cross a lane mark within a specified period of time after a turn light signal is input, a case where the vehicle crosses a lane mark within the specified period of time after the turn light signal is input, a case where the vehicle does not get out of a lane mark even through a specified period of time elapses after the vehicle crosses the lane mark, a case where a lateral control is released, and a case where collision with a nearby vehicle is expected.

In this case, the vehicle driving state display device 100 may determine that the vehicle is in the hands-off state when the driver's steering torque is lower than a hands-off reference torque for a specified time, and may determine that the driver has willingness to operate directly (override) when the driver's steering torque exceeds a reference torque.

In the cancel state, the vehicle driving state display device 100 determines whether the lane changeable condition is met or not. In operation S500, the vehicle driving state display device 100 transitions the state of the lane change assistance function to the ready state when the lane changeable condition is met, and, in operation S400, transitions the state of the lane change assistance function to the standby state when the lane changeable condition is not met.

As described above, the vehicle driving state display device 100 may determine whether the state transition of the lane changeable condition occurs, based on whether the lane changeable condition is met, whether the lane change cancellation condition is met, whether the lane change is completed, and whether the failure condition of the lane change assistance function is met, and may display the result of determining whether the state transition of the lane change assistance function occurs through the display 130 step by step.

Hereinafter, with reference to FIGS. 4 to 10, a display method for each state of the lane change assistance function will be described in detail. However, as an example of the step-by-step notification according to the change in the state of the lane change assistance function, the form of the present disclosure is not limited to those of FIGS. 4 to 10 and the step-by-step notification may be performed in various schemes.

FIG. 4 is a table illustrating an example of a method of displaying each lane change assistance function state in some forms of the present disclosure.

Figure 5:
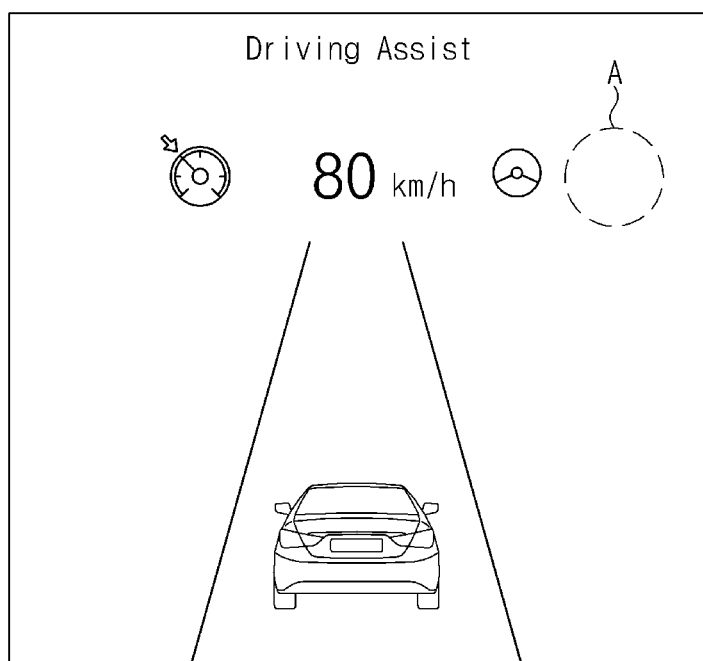
FIG. 5 is a diagram illustrating an example of a case in which the lane change assistance function in one form of the present disclosure is in an off state.

Referring to FIG. 4, the vehicle driving state display device 100 does not display anything when the lane change assistance function is in the off state. FIG. 5 is a diagram illustrating an example of a case in which the lane change assistance function in some forms of the present disclosure is in the off state, where there is no indication of the lane change assistance function as shown by reference numeral 'A'.

Figure 6:
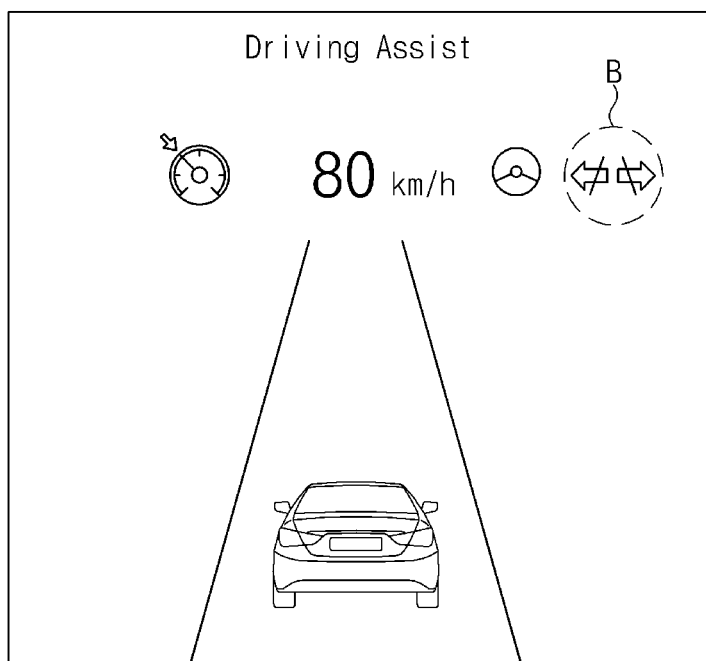
FIG. 6 is a diagram illustrating an example of a case in which the lane change assistance function in one form of the present disclosure is in a standby state.

When the lane change assistance function is in the standby state, a symbol (icon) indicating the lane change assistance function is displayed in a first color (e.g., white) (visual output). FIG. 6 is a diagram illustrating an example of a case in which the lane change assistance function in some forms of the present disclosure is in the standby state, where the symbol is turned on as shown by reference numeral 'B'.

Figure 7:
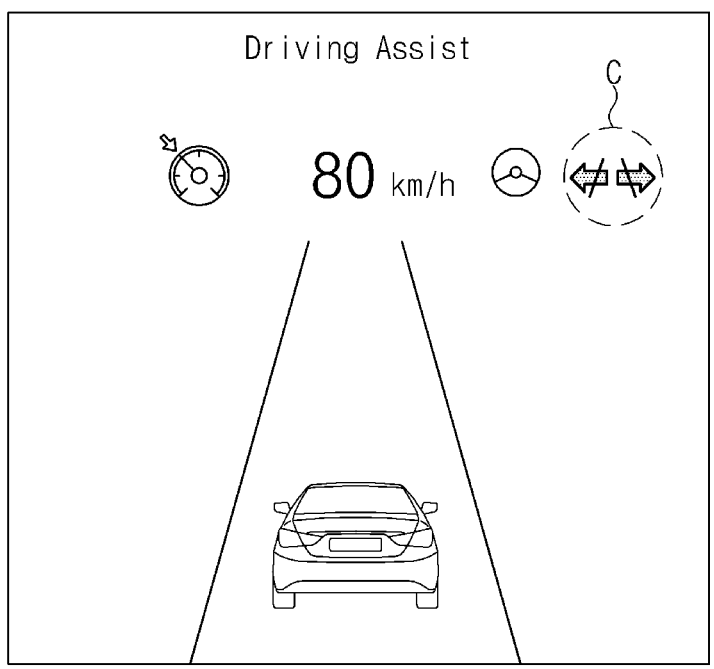
FIG. 7 is a diagram illustrating an example of a case in which the lane change assistance function in one form of the present disclosure is in a ready state.

In addition, the vehicle driving state display device 100 turns on and displays a symbol indicating the lane change assistance function in a second color (e.g., green) when the lane change assistance function is in the ready state. FIG. 7 is a diagram illustrating an example of a case in which the lane change assistance function in some forms of the present disclosure is in the ready state, where the symbol is turned on as shown by reference numeral 'C'.

Figure 8:
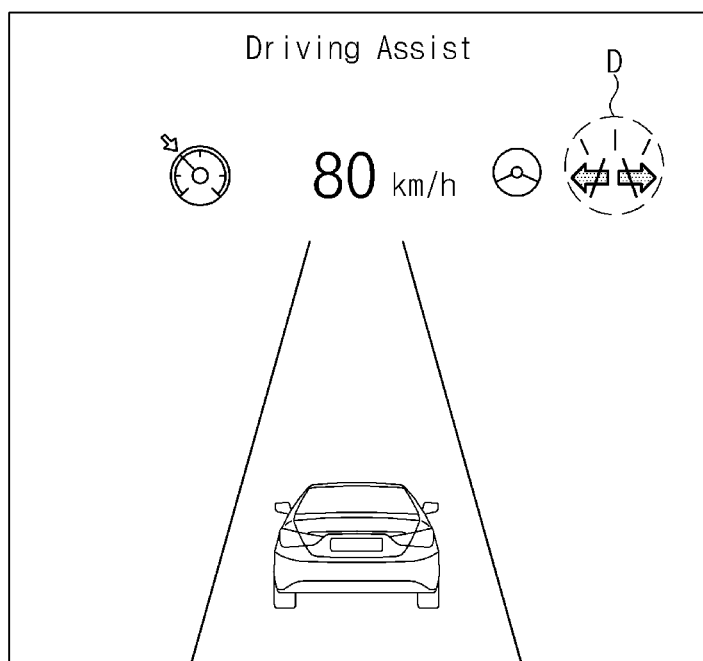
FIG. 8 is a diagram illustrating an example of a case in which the lane change assistance function in one form of the present disclosure is in an active state.

When the lane change assistance function is in the active state, the vehicle driving state display device 100 turns on and blinks the symbol indicating the lane change assistance function in the second color as in the ready state (visual output). FIG. 8 is a diagram illustrating an example of a case in which the lane change assistance function in some forms of the present disclosure is in the active state, where the symbol is turned on as shown by reference numeral 'D'.

Figure 9A:
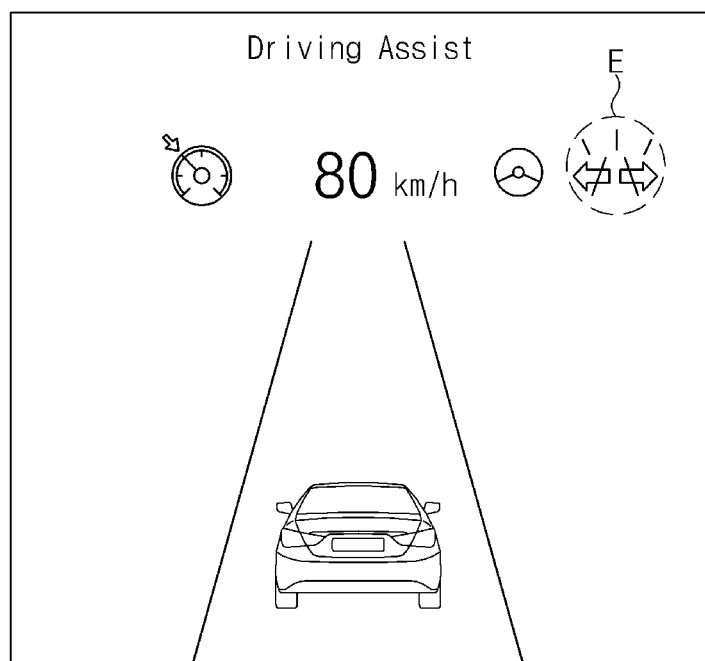
FIG. 9A is a diagram illustrating an example of a case in which the lane change assistance function in one form of the present disclosure is in a cancel state.
Figure 9B:
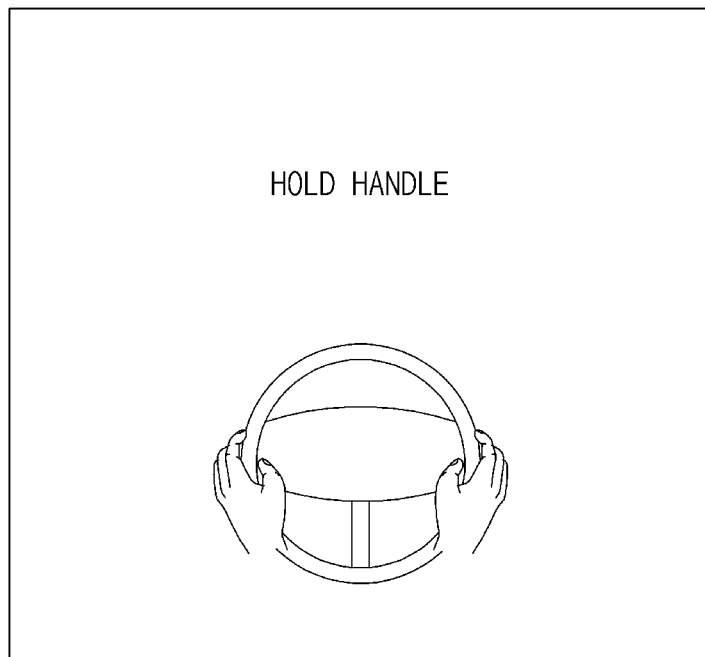
FIG. 9B is a diagram illustrating an example of a popup window displayed for a user when the lane change assistance function in one form of the present disclosure is in the cancel state.

In addition, when the lane change assistance function is in the cancel state, the vehicle driving state display device 100 may turn on and blink the symbol indicating the lane change assistance function in the first color as in the ready state of the lane change assistance function, and may perform the tactile or auditory output together with the visual indication. In this case, the vehicle driving state display device 100 may output the steering wheel haptic, the seat vibration, and the like for the tactile output and output the beep sound, the voice guidance, and the like for the auditory output, so that the user may be informed that the lane change assistance function is the cancel state. In this case, the vehicle driving state display device 100 may perform the visual output and the auditory output, the visual output and the tactile output, or the visual output, the audible output and the tactile output at the same time as soon as the lane change assistance function is transitioned to the cancel state, and may maintain the visual output after the auditory output and the tactile output are performed for a specified time (e.g., 2 seconds). In addition, the vehicle driving state display device 100 may perform blinking in a blinking period of the visual output, which is the same as that in the active state, or more slowly in a blinking cycle having the same visual output as the active state. However, when the lane change assistance function enters the cancel state due to a dangerous situation such as the cancellation of the lateral control, the user may be informed of the dangerous situation by continuously increasing the blinking cycle, and the auditory or tactile output may continue to be performed in the dangerous situation. FIG. 9A is a diagram illustrating a case where the lane change assistance function in some forms of the present disclosure is in the cancel state. FIG. 9B is a diagram illustrating an example of a popup window displayed for a user when the lane change assistance function in some forms of the present disclosure is in the cancel state, where it may be known that the symbol is turned on and blinked as shown by reference numeral 'E'. When the lane change assistance function is transitioned to the cancel state due to the hands-off of the user, a phrase to induce the user to perform hands-on as shown in FIG. 9B may be output after a notification of the cancel state is output as shown in FIG. 9A, and the contents shown in FIGS. 9A and 9B may be simultaneously output to the main screen of the display 130.

Figure 10:
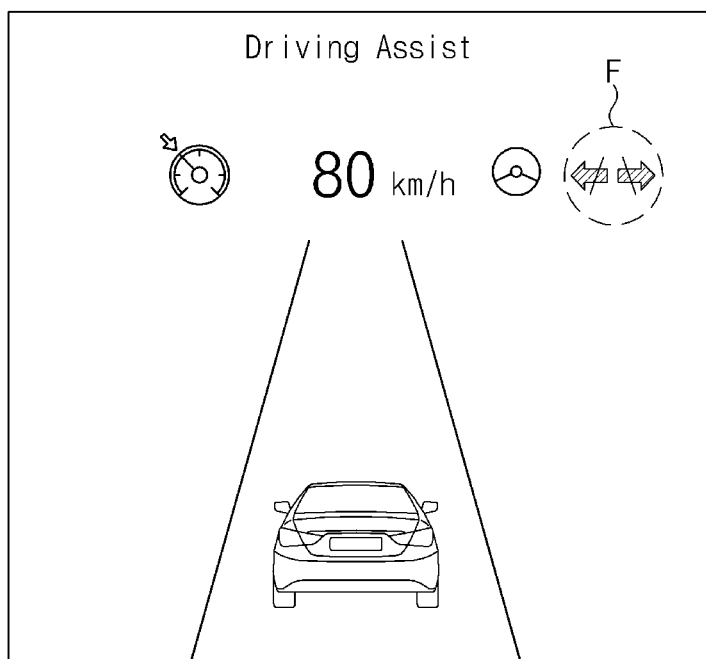
FIG. 10 is a diagram illustrating an example of a case in which the lane change assistance function in one form of the present disclosure is in the failure state.

In addition, the vehicle driving state display device 100 may turn on the symbol indicating the lane change assistance function in a third color (e.g., orange) when the lane change assistance function is in the failure state, and may perform the tactile or auditory output together or simultaneously perform the visual, auditory and tactile outputs so that the user is actively informed that the lane change assistance function is in the failure state. In addition, the vehicle driving state display device 100 may perform the visual and tactile outputs, or the visual and auditory outputs immediately after the lane change assistance function is transitioned to the failure state, and then maintain the visual output. In this case, the vehicle driving state display device 100 may perform the tactile and audible outputs for a specified time (e.g., three seconds), and may perform the tactile or auditory output for a longer time than when the lane change assistance function is in the cancel state. FIG. 10 is a diagram illustrating an example of a case in which the lane change assistance function in some forms of the present disclosure is in the failure state. Thus, as shown by reference numeral 'F', it may be known that the symbol is turned on and blinked.

As described above, in some forms of the present disclosure, the state of the vehicle driving assistance function is segmented and displayed so that the user may recognize it at a glance while driving, and the audible and tactile outputs are performed as well as the visual output so that the user may intuitively and quickly ascertain the state of the vehicle driving assistance function.

Figure 11:
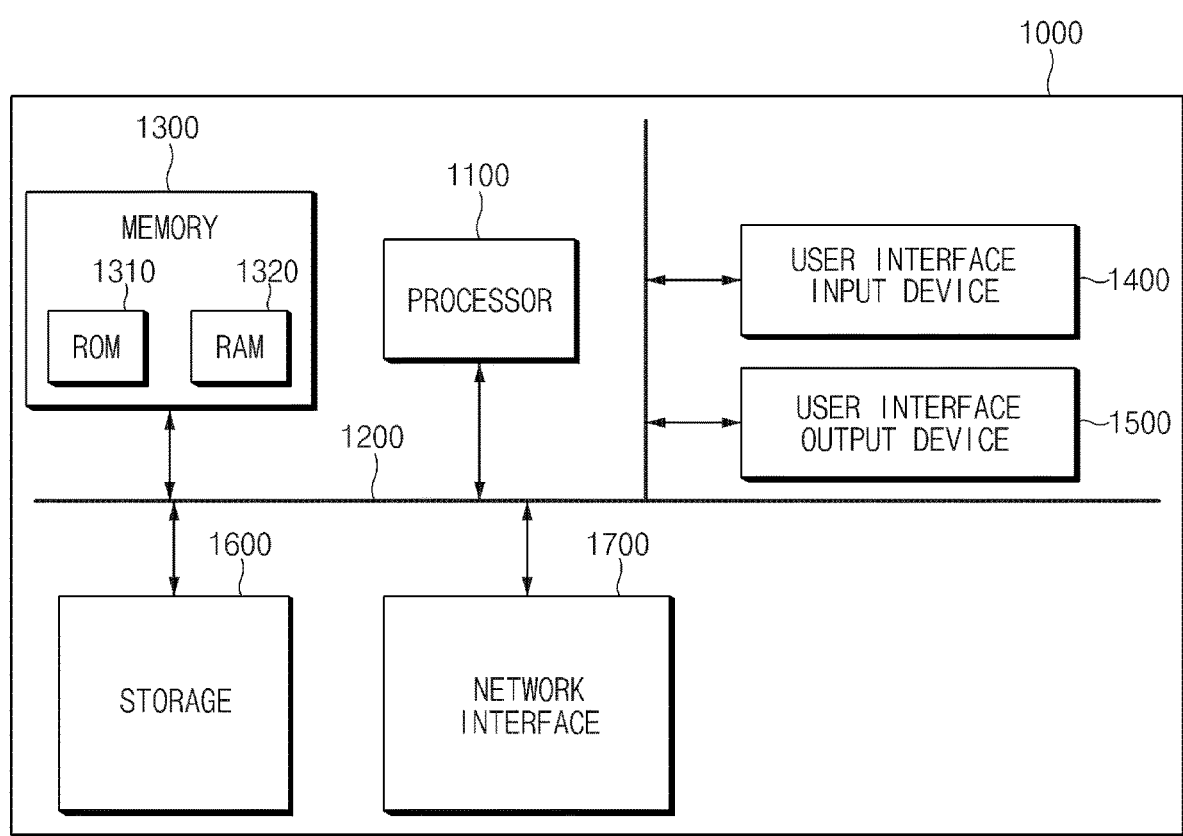
FIG. 11 is a block diagram illustrating a computer system in one form of the present disclosure.

FIG. 11 is a block diagram illustrating a computer system in some forms of the present disclosure.

Referring to FIG. 11, a computing system 1000 may include at least one processor 1100, a memory 1300, a user interface input device 1400, a user interface output device 1500, storage 1600, and an interface 1700, which are connected to each other through a bus 1200.

The processor 1100 may be a central processing unit (CPU) or a semiconductor device which performs processing for instructions stored in the memory device 1300 and/or the storage 1600. The memory 1300 and the storage 1600 may include various types of volatile or non-volatile storage media. For example, the memory 1300 may include a read only memory (ROM) and a random access memory (RAM).

The operations of a method or algorithm described in connection with some forms of the present disclosure disclosed herein may be embodied directly in hardware, in a software module executed by the processor 1100, or in a combination of the two. The software module may reside in a storage medium (that is, the memory 1300 and/or the storage 1600) such as a random access memory (RAM), a flash memory, a read only memory (ROM), an erasable programmable ROM (EPROM), an electrically erasable programmable ROM (EEPROM), registers, hard disk, a removable disk, a compact disc-ROM (CD-ROM), etc.

An exemplary storage medium is coupled to the processor 1100 such that the processor 1100 may read information from, and write information to, the storage medium. Alternatively, the storage medium may be integrated into the processor 1100. The processor and the storage medium may reside in an ASIC. The ASIC may reside within a user terminal. Alternatively, the processor and the storage medium may reside in the user terminal as individual components.

Although some forms of the present disclosure have been described for illustrative purposes, those skilled in the art will appreciate that various modifications, additions and substitutions are possible, without departing from the scope and spirit of the disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for displaying a driving state of a vehicle, the apparatus comprising:
   a processor configured to:
      determine a change in a state of a lane change assistance function; and
      control a step-by-step notification based on the change in the state of the lane change assistance function; and
   a display controlled by the processor and configured to display the step-by-step notification based on the change in the state of the lane change assistance function,
   wherein the state of the lane change assistance function includes at least one of:
      a first state in which the lane change assistance function is turned off;
      a second state in which the vehicle enters an operating section of the lane change assistance function;
      a third state in which a lane changeable condition is not met;
      a fourth state in which the lane changeable condition is met;
      a fifth state in which a lane change is possible;
      a sixth state in which a lane change cancel condition is met; or
      a seventh state in which a failure condition of the lane change assistance function is met,
   wherein the processor is further configured to:
      immediately perform the notification by using tactile outputs or auditory outputs together with visual outputs when a switch to the sixth state or the seventh state is performed;
      stop the tactile outputs or the auditory outputs; and
      maintain the visual outputs after a preset amount of time.

2. The apparatus of claim 1, wherein the processor is configured to separately display, with the display, each of the first state to the seventh state by using at least one of a symbol, whether a light is turned on, a light color, whether the light is blinked, or a blink rate.

3. The apparatus of claim 1, wherein the processor is configured to:
output, with the display, a screen without displaying the lane change assistance function in the first state;
turn on, with the display, a symbol of the lane change assistance function in a first color in the second state;
turn on, with the display, the symbol of the lane change assistance function in a color different from the first color in the third state; and
blink, with the display, the symbol of the lane change assistance function in the fourth state.

4. The apparatus of claim 1, wherein the processor is configured to perform the notification by using at least one of the visual outputs, the tactile outputs or the auditory outputs in the sixth state or the seventh state.

5. The apparatus of claim 1, wherein the processor is configured to:
perform the tactile outputs through a steering wheel haptic or a seat vibration; and
perform the auditory outputs through a beep or a voice guidance.

6. The apparatus of claim 1, wherein, when information about a surrounding object exists as a sensor measured value is received after the vehicle starts, the processor is configured to:
determine that a sensor is in a normal operation; and
switch the lane change assistance function from the first state to the second state, wherein the information about the surrounding object is received at a position apart from a distance greater than or equal to a predetermined distance of the vehicle.

7. The apparatus of claim 1, wherein the processor is configured to:
switch the lane change assistance function to the fifth state when a user input is generated in the fourth state and a risk of collision does not exist; and
switch the lane change assistance function to the fourth state when the lane change is completed in the fifth state.

8. The apparatus of claim 1, wherein the processor is configured to:
determine that a failure condition of the lane change assistance function is met; and
switch the lane change assistance function from the first state to the seventh state when a sensor fails or an error occurs in a controller area network (CAN) signal when the lane change assistance function is performed.

9. The apparatus of claim 1, wherein the processor is configured to:
switch the lane change assistance function from the second state to the third state when:
a lane change-on operation is performed and an object is not sensed in a lane change-off operation state, wherein the lane change assistance function is impossible in the object; or
in the change-on operation state, a lateral control-off operation state is switched to a later control-on operation state and the object is not sensed.

10. The apparatus of claim 1, wherein the processor is configured to determine whether the lane changeable condition is met by using at least one of whether a lane exists, a curvature of a road that the vehicle travels, a current speed of the vehicle, whether a lateral control is operated, or a road condition.

11. The apparatus of claim 1, wherein the processor is configured to determine that the lane changeable condition is met when:
a lane exists and the vehicle travels on a road having a curvature equal to or less than a lane change limiting curvature;
the vehicle travels at a lane changeable speed;
a lateral control is operated; or
the lane change is not possible on the road within a specified distance in front of the vehicle or at a current vehicle location.

12. The apparatus of claim 1, wherein the processor is configured to determine that the lane change cancel condition is met when at least one case of a plurality of cases is met, wherein the plurality of cases includes:
a first case where an emergency light switch is turned on before the vehicle crosses a lane mark;
a second case where a user setting menu (USM) is turned off before the vehicle crosses the lane mark;
a third case where a hands-off is sensed before the vehicle crosses the lane mark;
a fourth case where a speed of the vehicle deviates from a lane changeable speed before the vehicle crosses the lane mark;
a fifth case where a forward collision-avoidance assist (FCA) or a blind-spot collision-avoidance assist (BCA) is operated before the vehicle crosses the lane mark;
a sixth case where the lane mark disappears;
a seventh case where the vehicle does not cross the lane mark within a specified amount of time after a turn light signal is input;
an eighth case where the vehicle crosses the lane mark within the specified amount of time after the turn light signal is input;
a ninth case where the vehicle does not exit the lane mark within the specified amount of time after the vehicle crosses the lane mark;
a tenth case where a lateral control is released; and
an eleventh case where collision with a nearby vehicle is expected.

13. The apparatus of claim 1, wherein the processor is configured to switch the lane change assistance function from the third state to the second state when the vehicle is in a lane change-off operation state, or an object is sensed.

14. The apparatus of claim 13, wherein the processor is configured to output, by the display, a pop-up window that indicates whether to enter a lane change operation mode when:
a lane change-on operation is performed when the first state is switched to the second state; or
the object disappears when the third state is switched to the second state.

15. A vehicle system comprising:
a vehicle driving state display device configured to:
determine a change in a state of a lane change assistance function; and
output a step-by-step notification based on the change in the state of the lane change assistance function;
a tactile output device controlled by the vehicle driving state display device and configured to tactually output the step-by-step notification; and
an auditory output device controlled by the vehicle driving state display device and configured to auditorily output the step-by-step notification,
wherein the state of the lane change assistance function includes at least one of:
a first state in which the lane change assistance function is turned off;
a second state in which the vehicle enters an operating section of the lane change assistance function;

a third state in which a lane changeable condition is not met;
a fourth state in which the lane changeable condition is met;
a fifth state in which a lane change is possible;
a sixth state in which a lane change cancel condition is met; or
a seventh state in which a failure condition of the lane change assistance function is met,
wherein a processor is configured to:
immediately perform the notification by using tactile outputs or auditory outputs together with visual outputs when a switch to the sixth state or the seventh state is performed;
stop the tactile outputs or the auditory outputs; and
maintain the visual outputs after a preset amount of time.

16. The vehicle system of claim 15, wherein the step-by-step notification is separately displayed by using at least one of a symbol, whether a light is turned on, a light color, whether the light is blinked, or a blink rate.

17. The vehicle system of claim 15,
wherein the tactile output device is configured to output a steering wheel haptic or a seat vibration, and
wherein the auditory output device is configured to output a beep or a voice guide.

18. A method of displaying a driving state of a vehicle, the method comprising:
determining a change in a state of a lane change assistance function by using at least one of whether a sensor is in a normal operation, a lane changeable condition, or a lane change cancel condition; and
outputting a step-by-step notification based on the change in the state of the lane change assistance function,
wherein the state of the lane change assistance function includes at least one of:
a first state in which the lane change assistance function is turned off;
a second state in which the vehicle enters an operating section of the lane change assistance function;
a third state in which a lane changeable condition is not met;
a fourth state in which the lane changeable condition is met;
a fifth state in which a lane change is possible;
a sixth state in which a lane change cancel condition is met; or
a seventh state in which a failure condition of the lane change assistance function is met,
wherein the method further includes:
immediately performing the notification by using tactile outputs or auditory outputs together with visual outputs when a switch to the sixth state or the seventh state is performed;
stopping the tactile outputs or the auditory outputs; and
maintain the visual outputs after a preset amount of time.

* * * * *